(12) United States Patent
Reynolds et al.

(10) Patent No.: US 6,701,457 B2
(45) Date of Patent: Mar. 2, 2004

(54) PARTITIONED AVIONICS COMPUTER AND A METHOD AND SYSTEM FOR DEBUGGING

(75) Inventors: Brian A. Reynolds, Lisbon, IA (US); Timothy R. Fannin, Urbana, IA (US)

(73) Assignee: Rockwell Collins, Cedar Rapids, IA (US)

(*) Notice: Subject to any disclaimer, the term of this patent is extended or adjusted under 35 U.S.C. 154(b) by 529 days.

(21) Appl. No.: 09/772,822

(22) Filed: Jan. 30, 2001

(65) Prior Publication Data

US 2002/0104043 A1 Aug. 1, 2002

(51) Int. Cl.[7] .............................................. G06F 11/00
(52) U.S. Cl. ........................................ 714/31; 714/30
(58) Field of Search ............................. 714/30, 31, 37, 714/38, 5

(56) References Cited

U.S. PATENT DOCUMENTS

| | | | | | |
|---|---|---|---|---|---|
| 4,881,228 | A | * | 11/1989 | Shouda ......................... | 714/38 |
| 6,067,586 | A | * | 5/2000 | Ziegler et al. ................. | 710/18 |
| 6,094,530 | A | * | 7/2000 | Brandewie .................... | 717/127 |
| 6,226,761 | B1 | * | 5/2001 | Berstis ......................... | 714/37 |
| 6,314,530 | B1 | * | 11/2001 | Mann ........................... | 714/38 |
| 6,401,013 | B1 | * | 6/2002 | McElreath ..................... | 701/3 |
| 6,430,707 | B1 | * | 8/2002 | Matthews et al. ............. | 714/37 |
| 2002/0078404 | A1 | * | 6/2002 | Vachon et al. ................. | 714/38 |

* cited by examiner

Primary Examiner—Scott Baderman
Assistant Examiner—Joshua A Lohn
(74) Attorney, Agent, or Firm—Nathan O. Jensen; Kyle Eppele

(57) ABSTRACT

A system and method for debugging a partitioned avionics computer which uses a debugging dump memory and a debugging dump memory controller which take control of the main system bus of the computer for a predetermined amount of time.

20 Claims, 1 Drawing Sheet

PARTITIONED AVIONICS COMPUTER AND A METHOD AND SYSTEM FOR DEBUGGING

FIELD OF THE INVENTION

The present invention generally relates to computers, and more particularly relates to partitioned computers, and even more particularly relates to methods and systems for debugging partitioned avionics computers.

BACKGROUND OF THE INVENTION

In recent years, partitioned computers have become increasingly prevalent in many industries. One example is the aviation electronics community where cockpit integration has progressed so extensively that what was once a collection of numerous independent hardware black boxes is now a single partitioned avionics computer which hosts independent proprietary avionics software programs produced by competing avionics companies. In the avionics industry, it is also often necessary to service such equipment in a very rapid manner. If such avionics equipment requires such extensive service that the aircraft is even temporarily taken out of revenue service, the financial impact on the airline can be substantial. Consequently, it is desirable to have a system and method for debugging such software systems in an efficient manner, which also does not require disclosure of the contents of one avionics company's proprietary software to its competitor.

One prior art approach to this situation has been to interrupt the normal functioning of the system processor by capturing the processor and using it to examine and debug the various partitioned memory sections of the computer.

While this approach has been used extensively in the past, it does have obvious drawbacks. For example, capturing and using the system processor until the debugging operation is complete can be quite time consuming and, therefore, disruptive to the normal operation of the computer.

Consequently, there exists a need for improved methods and systems for debugging partitioned avionics computers in an efficient manner.

SUMMARY OF THE INVENTION

It is an object of the present invention to provide a system and method for debugging a computer in an efficient manner.

It is a feature of the present invention to utilize an independent debugging dump memory and debugging dump memory controller.

It is another feature of the present invention to dedicate a predetermined amount of processor time of the primary processor in the host operating system to memory transfer for debugging purposes.

It is an advantage of the present invention to permit debugging of computers without requiring the main system microprocessor to perform debugging operations.

It is another advantage of the present invention to permit debugging without compromising safety or guaranteed performance.

It is another advantage of the present invention to permit debugging of computers with installed software, which has received an official review and response from an official of a governmental agency which regulates air safety, while such computers and software are in use for revenue service.

The present invention is an apparatus and method for debugging computers designed to satisfy the aforementioned needs, provide the previously stated objects, include the above-listed features, and achieve the already articulated advantages. The present invention is carried out in an "interference-less" manner in a sense that the interference in the normal operation of a host computer during debugging operations has been greatly reduced and that such interference is known a priori.

Accordingly, the present invention is a system and method including a computer having an independent debugging dump memory and a debugging dump memory controller, which takes control of the memory access bus for a predetermined amount of time on a predefined schedule. The debug controller and other mechanisms of the present invention may be implemented as separate physical components, or included within the physical design and implementation of a single physical device.

Control may be returned to the main system by either of two means: Preemption of the debug mechanism by the main processor at the completion of a predefined time interval, or by release of main system resources by the debug system at the completion of the memory transfer.

The present invention has utility for initial development testing, hardware/software integration and testing, requirements verification and validation, as well as other testing either prior to or following official review and response from an official of a governmental agency who regulates air safety (commonly called appliance approval).

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
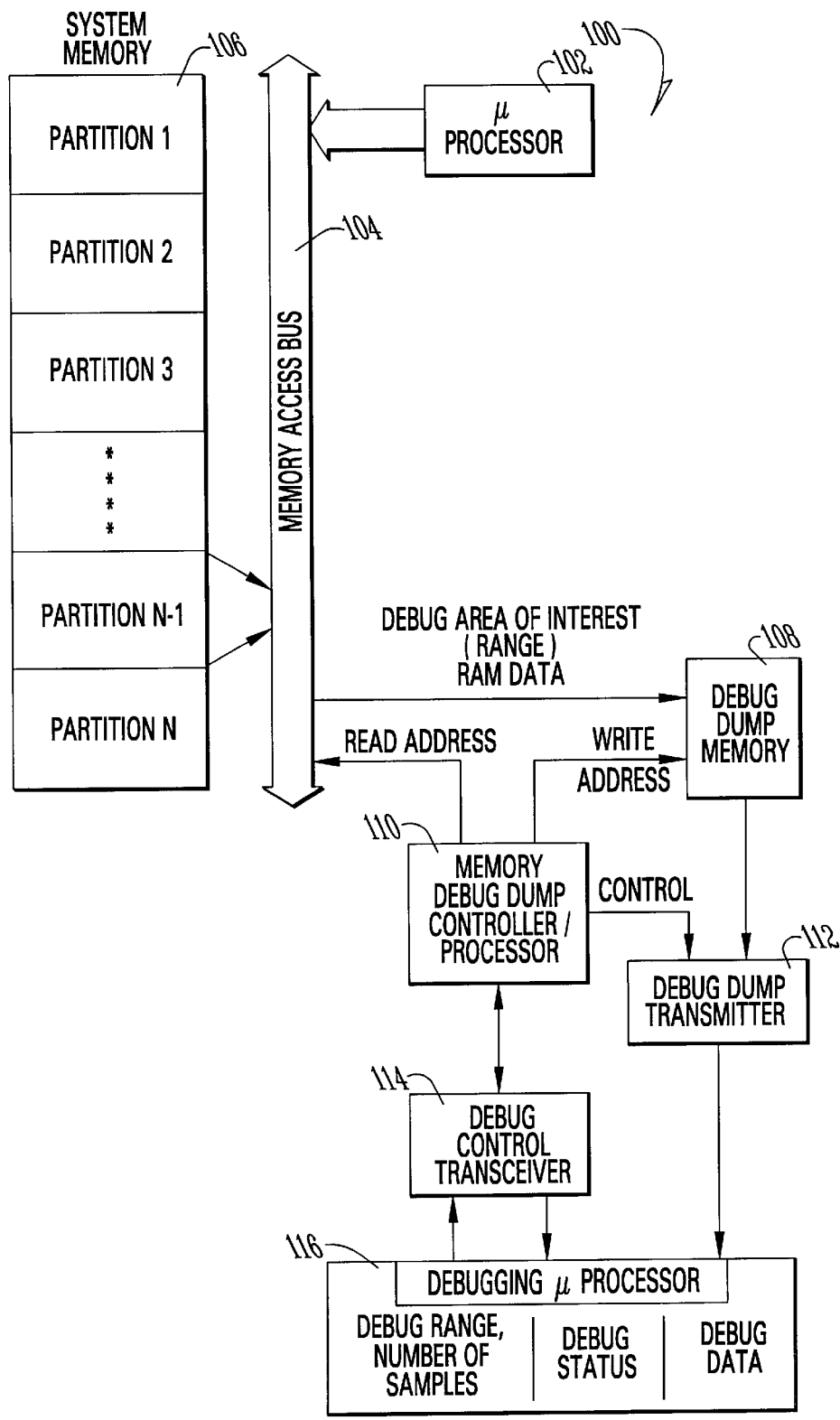
FIG. 1 is a simplified block diagram view of a system of the present invention.

Now referring to the drawings wherein like numerals refer to like matter throughout, and more specifically referring to FIG. 1, there is shown a system of the present invention generally designated 100, including a main system microprocessor 102, which could be any type of processor which is capable of both executing the programs in main system memory 106 and administering the system 100. Main system memory 106 is coupled to main system microprocessor 102 via memory access bus 104. Main system memory 106 can be any suitable RAM memory. In a preferred embodiment, main system memory 106 is a partitioned RAM memory having "n" partitions of either a physical or logical nature. Each partition contains an independent proprietary avionics software program. Several competing avionics manufacturers can be the sources for these programs. Memory access bus 104 can be any suitable data bus. Coupled to memory access bus 104 is debug dump memory 108. This debug dump memory 108 is preferably any type of RAM memory which is capable of rapidly receiving large amounts of data from memory access bus 104. Debug dump memory controller/processor 110 can be a microprocessor, a programmable logic device, or any direct memory access controller which will facilitate the copying of the desired data in main system memory 106 to debug dump memory 108, so such data can be used by another processor which is independent of main system microprocessor 102 and which will perform debugging operations. These debugging operations may be done either synchronously or asynchronously, depending upon the precise overall system application.

Debug dump transmitter 112 and debug control transceiver 114 are shown as intermediate structure and/or functions which may be support for or part of the debugging processor 116, which could be a general purpose microprocessor or any application specific integrated circuit or other computing device capable of performing debugging operations or an external storage device or combination thereof.

In operation, the apparatus and method of the present invention as described in FIG. 1 could function as follows:

The partitions of main system memory 106 are executed by main system microprocessor 102 in a context switching arrangement, which is when the main system microprocessor 102 brings one partition into focus, and the code resident therein is allowed to actually execute. FIG. 1 shows two lines between the partition n−1 and the memory access bus 104. This depicts that this partition is currently the one being executed by main system microprocessor 102. When a partition is switched into context, the code therein is executed until either 1) it is finished (non-preemptive scheduler) or 2) until main system microprocessor 102 detects that it is time to suspend further execution of that partition (preemptive scheduler). At this time, the contents of all registers and transitory memory locations are saved into main system memory 106; i.e., it is "switched out." The scheduler function performed by main system microprocessor 102, or another device, then cycles to the next partition and switches it in for execution. The process is repeated until all "n" partitions have been switched in and out. In all cases, the contents of the memory locations preserve the final or intermediated products of the processes which run during the partition time. When all partitions have had their execution time, then main system microprocessor 102 transfers control of memory access bus 104 to debug dump memory controller/processor 110 for a short time to allow for the debug dump process to occur. During the time that debug dump memory controller/processor 110 has control of memory access bus 104, the actions are merely reading one or more chosen memory locations in main system memory 106 and simultaneously writing such data into debug dump memory 108. Due to its dedicated function and use of direct memory access, data is copied into the debug dump memory 108 at a much higher rate than data would be processed if the main system microprocessor 102 were to perform the debugging operations itself. After the desired data is copied into debug dump memory 108, control of memory access bus 104 is switched back to main system microprocessor 102, which then begins to cycle through the partitions executing the code therein. During this time when main system microprocessor 102 is executing the partitions of main system memory 106, the debug dump memory 108 is "off line" and is accessible to debugging processor 116. This system allows for simultaneous normal operation and debugging operations. It should also be noted that the system 100 does not require that an entire copy of main system memory 106 be made for debugging purposes because it allows debug dump memory controller/processor 110 to have access to whatever portions of main system memory 106 as are necessary to perform the desired debugging operations.

Throughout this description, reference is made to avionics and partitioned computers and to partitioned proprietary avionics software programs, because it is believed that the beneficial aspects of the present invention would be most readily apparent and valuable when used in connection with such computers and such programs; however, it should be understood that the present invention is not intended to be limited to avionics computers, partitioned computers, or avionics software programs and should be hereby construed to include other non-avionics, non-partitioned computers and non-avionics software programs as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A computer system comprising:

a main system microprocessor;

a memory access bus coupled to said main system microprocessor;

a main system memory coupled to said memory access bus;

a debug dump memory coupled to said memory access bus;

a debug dump memory controller coupled to said memory access bus and said debug dump memory;

during an interval when control of memory access is given over to said debug dump memory controller, said debug dump memory controller assists in reading portions of said main memory and then writing said portions of said main system memory into said debug dump memory; and, after expiration of the interval, when control of memory access bus is removed from debug memory controller, debugging microprocessor is free to perform debugging operations without interfering further with normal operations of main system microprocessor in executing programs in main system memory.

2. A system of claim 1 wherein said main system microprocessor is a general purpose microprocessor.

3. A system of claim 2 wherein said main system memory is RAM.

4. A system of claim 3 wherein control of said memory access bus is maintained by said main system microprocessor.

5. A system of claim 4 wherein said debug dump memory controller is a device used to facilitate direct memory access at a transfer rate which exceeds a clock speed of said main system microprocessor.

6. A system of claim 4 wherein said interval has a predetermined periodicity.

7. A system of claim 3 wherein said main system memory is partitioned into a plurality of independent partitions, each containing an independent avionics program.

8. A system of claim 7 wherein said independent avionics program has received an official review and response from an official of a government agency that regulates air safety.

9. A method of debugging a computer comprising:

executing a software program in a first partition of a main system memory having software code therein with a main system microprocessor in a context switching arrangement over a memory access bus;

switching control of said memory access bus from said main system microprocessor to a debug dump memory controller for a debug dump interval;

reading said software code in response to instructions from said debug dump memory controller during the debug dump interval;

writing said software code to a debug dump memory during the debug dump interval;

using said software code in a debugging microprocessor to perform debugging tasks for said software code disposed in said main memory after expiration of the debug dump interval; and executing said software code in said main system memory by said main system microprocessor after expiration of the debug dump interval without interference from said debugging tasks.

10. A method of claim 9 wherein said main system memory is a partitioned memory containing a plurality of independent avionics programs further comprising the step of switching to a next partition and executing a next software program therein with said main system microprocessor.

11. A method of claim 10 further comprising executing the next software program until finished or preempted by the main system microprocessor.

12. A method of claim 11 further comprising repeating the steps of claim 10 and 11 until all partitions of the main memory are switched in and out and software therein is executed.

13. A method of claim 12 wherein the step of switching control of said memory access bus from said main system microprocessor to a debug dump memory controller for the debug dump interval is performed after all partitions of the main memory are switched in and out and software therein is executed.

14. A method of claim 9 wherein the step of writing said software code is performed at a higher rate than the step of executing said software code in said main memory by said main system microprocessor.

15. A method of claim 9 wherein the step of reading said software core comprises reading a portion of said software code in response to instructions from said debug dump memory controller during the debug dump interval.

16. A method of claim 9 further comprising the step of idling said main microprocessor during said debug dump interval.

17. A system for debugging a computer comprising:

a memory access bus;

a main system memory coupled to the memory access bus and having a plurality of partitions containing software programs therein;

a main system microprocessor coupled to the memory access bus and executing the software programs in the plurality of partitions in the main system memory in a context switching arrangement;

a debug dump memory controller for accessing partitions of the main system memory over the memory access bus during a debug dump interval;

a debug dump memory for storing data from said partitions during the debug dump interval;

a debugging processor for using said data from said partitions stored in said debug dump memory for performing debugging operations after the debug dump interval; and wherein said main system microprocessor resumes executing the software programs in the plurality of partitions after the debug dump interval.

18. A system of claim 17 wherein said debugging processor operates simultaneously with the main system microprocessor after the debug dump interval.

19. A system of claim 18 wherein said main system microprocessor executes a first avionics program in a first partition in said main system memory, switches to a second partition and executes a second avionics program, and continues switching and executing until all partitions are switched to and executed.

20. A system of claim 19 wherein said debug memory controller accesses partitions of said main system memory after all partitions are switched to and executed by said main system microprocessor.

* * * * *